(12) United States Patent
Holmes et al.

(10) Patent No.: US 7,276,555 B2
(45) Date of Patent: Oct. 2, 2007

(54) AMIDE-MODIFIED RESIN OR HYDROCARBYL MOIETY FOR DISPERSING A PIGMENT

(75) Inventors: Christopher J. Holmes, Orland Park, IL (US); Richard K. Winblad, Momence, IL (US); Rudolf Anthonius Maria Venderbosch, Duiven (NL); Richard Hendrikus Gerrit Brinkhuis, Zwolle (NL)

(73) Assignee: Hexion Specialty Chemicals, Inc., Columbus, OH (US)

( * ) Notice: Subject to any disclaimer, the term of this patent is extended or adjusted under 35 U.S.C. 154(b) by 317 days.

(21) Appl. No.: 10/441,171

(22) Filed: May 19, 2003

(65) Prior Publication Data

US 2003/0225186 A1 Dec. 4, 2003

Related U.S. Application Data

(60) Provisional application No. 60/382,188, filed on May 21, 2002.

(30) Foreign Application Priority Data

Jul. 19, 2002 (EP) .................................. 02077898

(51) Int. Cl.
*C08L 67/00* (2006.01)
*C08L 33/06* (2006.01)
*C08L 71/00* (2006.01)
*C08L 75/00* (2006.01)
*C08L 77/00* (2006.01)

(52) U.S. Cl. ...................... 524/601; 524/556; 524/590; 524/606; 524/612; 525/375; 523/160

(58) Field of Classification Search ................ 524/555, 524/590, 601; 525/374, 375, 379; 523/160, 523/161
See application file for complete search history.

(56) References Cited

U.S. PATENT DOCUMENTS

| | | | |
|---|---|---|---|
| 3,284,177 A | 11/1966 | Lindstrom et al. | |
| 4,133,957 A * | 1/1979 | Riew | 544/357 |
| 4,794,121 A | 12/1988 | Laruelle et al. | 514/357 |
| 4,999,132 A * | 3/1991 | Canestri | 516/31 |
| 5,068,064 A | 11/1991 | Proietto et al. | 260/404.5 |
| 5,070,159 A | 12/1991 | Dietz et al. | 525/504 |
| 5,399,294 A * | 3/1995 | Quednau | 516/77 |
| 5,425,900 A | 6/1995 | Quednau | 252/356 |
| 5,610,224 A * | 3/1997 | DePue et al. | 524/538 |
| 6,077,460 A * | 6/2000 | Oppenlander et al. | 252/392 |
| 6,506,899 B1 * | 1/2003 | Simms | 544/222 |
| 6,509,409 B1 * | 1/2003 | Thetford | 524/589 |

FOREIGN PATENT DOCUMENTS

| | | |
|---|---|---|
| EP | 0402266 B1 | 2/1994 |
| GB | 1373660 A * | 12/1981 |
| JP | 10-212275 | 8/1998 |
| WO | WO 93/02131 A1 | 2/1993 |
| WO | WO 01/10923 A1 | 2/2001 |

OTHER PUBLICATIONS

Japanese Abstract : Publ. No. 2000-044553.
Japanese Abstract : Publ. No. 2000-048534.
Kirk-Othmer, *Encyclopedia of Chemical Technology*, Ed. M. Grayson et al., John Wiley & Sons (3rd Ed. vol. 17) 1982, pp. Cover, Contents 838-864, 871-873.
*The Printing Ink Manual*, Society of British Printing Ink Manufacturers LTD, Leach , D.H., et al. (5th Ed.), pp. Cover Contents, 709-710, 373, 814.
Resins for Surface Coatings, vol. 1, Edited by P.K.T. Oldring, pp. 130-135.
European Search Report for Application No. EP 03 07 6505 dated Aug. 22, 2003.
Patent Abstracts of Japan abstracting JP 10-212275, Jan. 31, 1997.

* cited by examiner

*Primary Examiner*—Callie Shosho

(57) ABSTRACT

A method of dispersing pigment using an amide-modified resin or an amide-modified hydrocarbyl moiety, and the resulting pigment concentrate or coating or ink composition.

24 Claims, No Drawings

AMIDE-MODIFIED RESIN OR HYDROCARBYL MOIETY FOR DISPERSING A PIGMENT

PRIORITY CLAIM

This application claims priority of U.S. Provisional Patent Application No. 60/382,188, filed May 21, 2002, and EPO Application No. 02077898.1, filed Jul. 19, 2002.

FIELD OF THE INVENTION

The invention pertains to a method of dispersing a pigment using an amide-modified resin or an amide-modified hydrocarbyl moiety, the resulting pigment concentrate and a coating or ink composition including the same.

BACKGROUND OF THE INVENTION

Amide-modified compounds as such are known. For instance, amides of pyridylalkylamines are known from U.S. Pat. No. 4,794,121 as products with pharmacological activity, among which are analgesic, antispasmodic, bronchodilator, antianoxic, and anticonvulsant activity. In Japanese patent application JP 50120485 piperazinylethyl lauramide is disclosed as an antistatic agent for PVC. Similar compounds were disclosed in EP 402,266 to exhibit antiseptic, antimicrobal, and disinfectant activity. Aminoalkylene amides with piperazinyl groups are disclosed in U.S. Pat. No. 3,284,177 as deposit-reducing additives to gasoline, and similar compounds are known from JP 10212275 to behave as lubricating substances for magnetic recording mediums.

In accordance with the invention, amide-modified compounds are used in a method for dispersing a pigment. This method can be used, for example, for producing a pigment concentrate and/or a coating composition. Popular pigment dispersing processes include flush and dry grind.

Pigments are generally produced in an aqueous medium. One of the steps in the manufacture of pigments is the precipitation from water. After precipitation of the pigment, the pigment/water mixture is filtered to provide a filter cake or presscake containing pigment and residual moisture.

When the pigment is to be incorporated in an organic or non-aqueous system for application to a substrate, it is necessary to remove the residual moisture from the filter cake or presscake. The presscake typically contains 30 to 80% by weight of water. Removal of residual water from a presscake is usually accomplished by a process of water displacement that is known as "flushing."

Flush processes are dispersion processes, such as those described in Kirk-Othmer, *Encyclopedia of Chemical Technology*, Ed. M. Grayson et al., John Wiley & Sons (3$^{rd}$ Ed. Vol. 17) 1982, pp. Cover, Contents 838-864, 871-873; and *The Printing Ink Manual*, Society of British Printing Ink Manufacturers LTD, Leach, D. H., et al. (5$^{th}$ Ed.), pp. Cover Contents, 709-710, 373, 814.

Generally speaking, flushing is the direct transfer of pigments in an aqueous phase to an oil or non-aqueous phase without intermediate drying. Flushing of the pigment is carried out by intensely mixing the presscake with a flushing varnish and/or ink solvent. A "flushing varnish" is an ink solvent containing a resin dissolved therein. The solvent and/or flushing varnish is often referred to as a "flushing agent." The term "ink solvent," as used herein, refers to any petroleum or vegetable derived material, which may be used to hold the resin system in solution.

As the pigment is wetted by the flushing agent, the water is driven out of the presscake until only a small percentage of water remains. The last traces of water are removed by applying a sub-atmospheric pressure and/or heat to the presscake. The flushing agent in effect flushes the water from the pigment resulting in pigment dispersion in the base of a coating/ink composition. Alkyd resins are sometimes used in addition to and as the flushing agent to assist in the break-out of water from the presscake.

Pigments at the presscake stage of manufacture have a particle size that is more suitable for generating maximum gloss and color strength in formulations than pigments in their finished dry form. Accordingly, flushed pigments produced without first drying the pigment are e.g. preferred colorants for lithographic ink formulations.

Problems may occur if the flush resin is too polar and the water layer will not be separated. If the flush resin is too apolar, the pigment particles will not properly be dispersed. These problems have now been solved by using the amide-modified resin or hydrocarbyl moiety in accordance with the invention.

The amide-modified resin or hydrocarbyl moiety is also advantageously used in other dispersing processes in accordance with the invention. Another exemplary dispersing process is dry grind. Grinding reduces particle size by mechanical means. It is an example of milling which can be used to obtain paint and other pigmented products. Generally, milling or grinding proceeds first by wetting pigment particles. Usually a dispersant, such as that utilized in the claimed invention, is added at this stage. The dispersant or dispersing agent can be added alone or in combination with other materials, such as a varnish. After wetting the pigment particles, the milling/grinding process usually breaks down larger particles under shear forces and then disperses the resulting smaller particles within the medium.

SUMMARY OF THE INVENTION

It has now been found that aminoalkylene amides, the amide group of which is bonded to a resin or a hydrocarbyl moiety, are extremely suitable to disperse pigments for coating or ink compositions, particularly for coating or ink compositions (including lithographic ink compositions) to be used in a flush process. The invention therefore pertains to the use of amide-modified resins or hydrocarbyl moieties for dispersing a pigment.

DETAILED DESCRIPTION OF THE INVENTION

In the inventive method, one or more amide modified resins or an amide-modified hydrocarbyl moieties are used to disperse pigments for coating or ink compositions. The amide-modified resin or hydrocarbyl moiety may be obtained by reacting a resin or a hydrocarbyl group with one or more amines. Preferred examples of suitable amines include compounds of the following formula:

wherein Het is a nitrogen-containing heterocyclic moiety, including, by way of non-limiting example, imidazole, pyridine and piperidine;

R represents at least one or more of the following substituents: H, C1-4 alkyl, and C1-4 alkoxy; and ALK is a branched or unbranched C1-6 alkylene group, including, by way of non-limiting example, an alkenyl group with 1 to 3 unsaturated carbon-carbon bonds (C=C).

Further representative examples of an amide-modified compound include compounds of the following formula:

wherein Het is a nitrogen containing heterocycle, in particular pyridine, imidazole, or piperidine;

ALK is a branched or unbranched alkylene group with 1-4 C atoms;

X is a branched or unbranched alkyl group with 5-30 C atoms, preferably 8-30 C atoms, or a polyester group, such as polycaprolactone.

In principle, any resin modified by an amine may be used in the present invention. Such resins include, by way of non-limiting example, a branched or unbranched C1-25 carboxyalkylene, carboxyalkenylene, or carboxyalkynylene group or a functional derivative thereof, polyurethane, polyether, polyacrylate, polyamide, acrylic resins, terpenes, and the like. When the resin comprises a branched or unbranched C1-25 carboxyalkylene, carboxyalkenylene, or carboxyalkynylene group or a functional derivative thereof and C is 1, the carboxylate group is directly bonded to the resin backbone. Preferably, the resin is a polyester or fatty-acid modified polyester.

A fatty-acid modified polyester is commonly referred to as an alkyd, alkyd resin, short oil alkyd, medium oil alkyd, long oil alkyd, oil modified polyester resin, or oil modified alkyd resin. The fatty-acid modified polyester can be prepared by either acidolysis, alcoholysis, or by a direct fatty acid process. These processes can be carried out by either reflux or fusion. See, for instance, *Resins for Surface Coatings*, Vol. 1, Edited by P. K. T. Oldring, pages 130-135. The polyester resin may include phenolic modified rosin esters, maleic modified rosin esters, rosin modified hydrocarbon resins, rosin (tall oil wood, gum), and fumarated rosin esters.

The resins comprise a carboxylate group for reaction with R-Het-ALK-NH$_2$, after which the amide is formed. The carboxylate group may also be a functional derivative thereof, including organic or inorganic esters, halides, anhydrides, lactones, and salts.

When, instead of a resin, a hydrocarbyl moiety is used, the hydrocarbyl moiety is a branched or unbranched carboxyalkylene, carboxyalkenylene, or carboxyalkynylene group or a functional derivative thereof having at least 5 carbon atoms, which may be substituted with an ester group. This hydrocarbyl further comprises a carboxylate group to form the amide with R-Het-ALK-NH$_2$, which carboxylate group may be a functional derivative thereof, including organic or inorganic esters, halides, anhydrides, lactones, and salts. Suitable hydrocarbyl groups can be derived from fatty acids, fatty acid oils and esters thereof, such as linseed oil, castor oil, sunflower oil, safflower oil, soybean oil, tung oil, oiticica oil, dehydrated castor oil (DCO), palm oil, fish oil, rapeseed oil, palm kernel oil, tall oil fatty acid, and the like.

The following is an example of a reaction resulting in an amide-modified polyester:

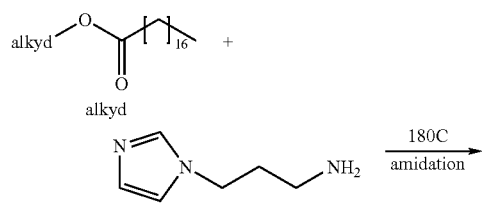

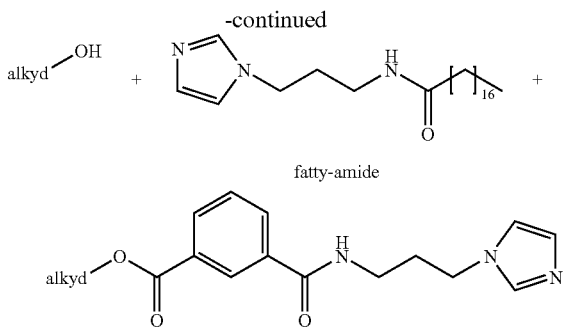

fatty-amide

The invention further relates to a coating or ink composition comprising the amide-modified resin or hydrocarbyl moiety detailed above.

These coating or ink compositions may further contain pigments and other additives that are commonly used in coating or ink compositions, such as, by way of non-limiting example, Pigment Red 53:1, Pigment Red 57:1, Pigment Red 81, Pigment Red 48:2, Pigment Violet 1, Pigment Violet 23, Pigment Blue 15:3, Pigment Green 7, Pigment Yellow 12, Pigment Yellow 13, Pigment Yellow 17, and Pigment Yellow 83.

In accordance with the present invention, the dispersing agent, such as the flush varnish used in the flush process or the dispersant (alone or mixed with a varnish) in a dry grind application, would include an amide-modified resin or hydrocarbyl moiety. In addition, the flush varnish may also include an unmodified alkyd resin that can assist in break out of water from the press cake.

As a result of using an amide-modified resin or hydrocarbyl moiety for dispersing pigment in accordance with the invention, more rapid and effective dispersion is achieved. Additionally, the dispersing method in accordance with the invention results in a composition with good rheology and pot life. A particular advantage of the invention is that it realizes increased tintorial strength in the final composition, not just the dispersing phase. For example, a standard lithol rubine flush has 35% pigment, and 50% flush is required, based on total ink content, to obtain 17.5% pigment in the finished ink. When the dispersant of the claimed invention is used, only 47% of the flush is required to achieve the same apparent tintorial strength or darkness from the pigment.

The following examples compare the flush times for flush varnishes A, B and C of the invention with a comparison flush varnish including an unmodified alkyd resin. The flush varnishes of the invention and of the comparison example were prepared using 95 wt. % of Akzo Nobel dispersion vehicle AKD9552™ (a mixture of hydrocarbon, maleic and phenolic resins and an alkyd resin) and 5 wt. % of a resin which varied according to the particular flush varnish being made. Flush varnish A includes resin A, flush varnish B includes resin B, flush varnish C includes resin C and the comparison flush varnish includes AKA 1103™ (ex. Akzo Nobel Resins, AV:7-12; Visc:68-82 seconds at 25° C. (77° F.)), an unmodified alkyd resin. Each of these flush varnishes were subjected to the following flushing procedure:

1.174 kg of a Lithol Rubine Red 57 press cake (examples are Sun Chemical 419-1996®, CDR 57PC953®, Apollo Colors RU57®) containing 21.3 wt. % of dry pigment was placed in a 3.791 (1 gallon) flusher (Baker Perkins sigma blade flusher) for first break. 0.300 kg of the flush varnish (see below) was added. Mixing was continued until the pigment separated from the water (first break time). Mixing was continued until the water cleared (clear time). The water was decanted off and the weight, conductivity and pH were measured.

Additionally, 0.352 kg of the Lithol Rubine Red 57® press cake were added into the flusher and another 0.050 kg of the flush varnish were added. Mixing was continued until the pigment separated from the water (second break time). Mixing was continued until the water cleared (clear time). The water was decanted off and the weight, conductivity, and pH were measured.

Another 0.352 kg of the Lithol Rubine Red 57® press cake and another 0.1 kg of flush varnish were added into the flusher. Mixing was continued until the pigment separated from the water (third break time). Mixing was continued until the water cleared (clear time). The water was decanted off and the weight, conductivity, and pH were measured.

Distilled water was added into flusher (enough to cover the pigment) and allowed to mix for ten minutes. The water was decanted off and the conductivity measured. The process was continued until the conductivity was below 1000 Siemens ($1/\Omega^{-1}$). Mixing was allowed for an additional ten minutes.

The flusher was placed under vacuum and kept under vacuum for one hour. (If mixing is insufficient, additional varnish may be added.) Then, the flusher was held under vacuum until all the water had been removed. After the water had been removed, 0.080 kg of the flush varnish and 0.050 kg of Magiesol M470® (Magie Brothers), a petroleum distillate, were added and adjusted to correct pigment concentration (40 wt. %). The flush was removed from the flusher.

Preparation of Resin A:

96.17 kg of AKA 1103™ (ex. Akzo Nobel Resins, AV:7-12; Visc:68-82 seconds at 25° C. (77° F.)) based on linseed oil, soya oil, pentaerythritol, and isophthalic acid were heated in a stirred vessel to 177° C. (350° F.) under a nitrogen blanket. Over a period of 10 min, 3.83 kg of 1-(3-aminopropyl)-imidazole were added subsurface. The reaction was completed in 1 h at 177° C. (350° F.) resulting in a resin with an acid value of 8.3 mg KOH/gram resin and a viscosity of 171 sec (Gardner line to line seconds at 25° C. (77° F.)).

Preparation of Resin B:

Resin B was prepared in the same manner as resin A, except that 3.83 kg of 3-aminomethyl-pyridine was added subsurface instead of 1-(3-aminopropyl)imidazole.

Preparation of Resin C:

Resin C was prepared in the same manner as resin A, except that 3.83 kg of amino-ethyl-piperazine was added subsurface instead of 1-(3-aminopropyl)imidazole.

Preparation of Flush Varnish A, B and C:

A flush formulation was prepared from 760 g of dispersion vehicle (AKD9552™, ex Akzo Nobel Resins) and 40 g of resin A, resin B, resin C or AKA 1103™. The resin was mixed at 82° C. and the viscosity was adjusted with Magiesol M470® (Magie Brothers), petroleum distillate, to a viscosity to 200 sec. LTL (line-to-line) at 38° C. (100° F.).

The comparison flush varnish includes AKA 1103™ (ex. Akzo Nobel Resins, AV:7-12; Visc:68-82 seconds at 25° C. (77° F.)), an unmodified alkyd resin.

As shown in Table 1, flush times were recorded as the total time (clear time and drying time) necessary for obtaining a waterless pigment.

TABLE 1

| Flush Varnish | total time (min) |
| --- | --- |
| Comparison | 274 |
| A | 210 |
| B | 237 |
| C | 228 |

With respect to the comparison example, flush varnish A shows a reduction of the total time from about 4.5 h to about 3.5 h. In terms of production capacity, this is an important improvement leading to up to about 25% higher production in a plant. Flush varnish B, which includes the less active resin (resin B) still shows a reduction of the total time from about 4.5 h to about 4 h, which may lead to a 10% production increase.

The above flush varnish A and comparison flush varnish were used to disperse pigment in a coating composition. The properties of the resulting compositions are shown in Table 2.

TABLE 2

| Flush Varnish | Comparison | A |
| --- | --- | --- |
| Flush Viscosity (Poise) | 5,160,000 | 3,090,000 |
| Flush Yield (Dyne/cm2) | 26,210 | 14,030 |
| Strength | Standard | 5% stronger |

As shown in Table 2, using a flush varnish in accordance with the invention results in a lower viscosity product with higher strength. Also, the lower flush yield shows that the pigment is better dispersed than the standard. This allows the pigment particles to be closer together and also allows the strength to be increased. Thus, it is advantageous in terms of speed (rate of breaks), strength, and viscosity. This results in various benefits, such as ease of handling, reduction in production costs, and more efficient use of expensive raw materials (pigment).

The strength is measured by mixing the ink or flush of both a known standard and an unknown batch with a bleach white (titanium dioxide in a varnish type medium). The "diluted" ink or flush is then drawn down on paper with the standard and unknown batch side by side. The strength is visually compared and then more bleach white is added to the stronger one. The difference is then calculated as strength. In this case, the flush made using flush varnish A needed 5% more bleach white to be as white as the standard made using the comparison flush varnish.

The invention is further illustrated by the following claims, which, however, do not limit the scope thereof.

We claim:

1. A method of dispersing a pigment comprising adding to the pigment an amide-modified resin or amide-modified hydrocarbyl moiety, obtained by modifying a resin, or a hydrocarbyl moiety, by reaction with one or mare compounds of the formula:

R-Het-ALK-NH$_2$ wherein Het is a nitrogen-containing heterocyclic moiety; R represents at least one H, a C1-4 alkyl, or a C1-4 alkoxy; and
ALK is a branched or unbranched C1-6 alkylene group, wherein the resin or hydrocarbyl moiety comprises a carboxylate group or a functional derivative thereof, wherein the resin is polyurethane, polyether, polyacrylate, polyamide, acrylic resin, polyester, terpene, or alkyd, and wherein the hydrocarbyl moiety is branched or unbranched C1-C25 carboxyalkylene, carboxyalkenylene, or carboxyalkynylene group, or a carboxylate functional derivative thereof which has at least 5 carbon atoms, and which may be substituted with an ester group.

2. The method of claim 1, wherein the resin is a polyester, polyurethane, polyether, polyamide, alkyd resin or terpene.

3. The method of claim 2, wherein the resin is a polyester comprising a carboxyalkenylene group having 1 to 3 unsaturated carbon-carbon bonds.

4. The method of claim 1, wherein Het is imidazole, pyridine, or piperidine.

5. The method of claim 1, wherein Het is imidazole.

6. The method of claim 1, wherein R is H.

7. The method of claim 1, wherein ALK is an unbranched C1-3 alkylene group.

8. A method of flushing a pigment comprising adding to the pigment a flushing agent comprising an amide-modified resin or amide-modified hydrocarbyl moiety, the amide-modified resin or amide-modified hydrocarbyl moiety obtained by modifying a resin or hydrocarbyl moiety by reaction with one or more compounds of the formula: R-Het-ALK-$NH_2$ wherein Het is a nitrogen-containing heterocyclic moiety; R represents at least one of H, C1-4 alkyl, or C1-4 alkoxy; and ALK is a branched or unbranched C1-4 alkylene group, wherein the resin or hydrocarbyl moiety comprises a carboxylate group or a functional derivative thereof, and wherein the resin is polyurethane, polyether, polyacrylate, polyamide, acrylic resin, polyester, terpene, or alkyd and wherein the hydrocarbyl moiety is branched or unbranched C1-25 carboxyalkylene, carboxyalkenylene, or carboxyalkynylene group, or a carboxylate functional derivative thereof which has at least 5 carbon atoms, and which may be substituted with an ester group.

9. The method of claim 8 wherein the flushing agent comprises an amide-modified polyester resin.

10. The method of claim 9, wherein the polyester resin comprises a carboxyalkenylene group with 1 to 3 unsaturated carbon-carbon bonds.

11. The method of claim 8, wherein Het is imidazole, pyridine, or piperidine.

12. The method of claim 8, wherein Het is imidazole.

13. The method of claim 8, wherein R is H.

14. The method of claim 8, wherein ALK is an unbranched C1-3 alkylene group.

15. A coating or ink composition made by dispersing pigment in the composition using a dispersant comprising an amide-modified resin or amide-modified hydrocarbyl moiety, the amide-modified resin or amide-modified hydrocarbyl moiety obtained by modifying a resin or hydrocarbyl moiety by reaction with one or more compounds of the formula: R-Het-ALK-$NH_2$ wherein Het is a nitrogen-containing heterocyclic moietys; R represents at least one of H, C1-4 alkyl, or C1-4 alkoxy and ALK is a branched or unbranched C1-6 alkylene group, wherein the resin or hydrocarbyl moiety comprises a carboxylate group or a functional derivative thereof, and wherein the resin is polyurethane, polyether, polyacrylate, polyamide, acrylic resin, polyester, terpene, or alkyd, and wherein the hydrocarbyl moiety is branched or unbranched C1-25 carboxyalkylene, carboxyalkenylene, or carboxyalkynylene.

16. The coating or ink composition of claim 15 wherein the dispersant comprises an amide-modified polyester resin.

17. A method of dispersing a pigment comprising adding to the pigment one or more amide-modified polyester resins of the following formula: Het-ALK-NH—CO—X wherein Het is a nitrogen-containing heterocyclic moiety; ALK is a branched or unbranched alkylene group with 1-4 C atoms; X is a polyester group.

18. The method of claim 17, wherein Het is pyridine, imidazole, or piperidine.

19. A method of flushing a pigment comprising adding to the pigment a flushing agent comprising one or more amide-modified polyester resins of the following formula: Het-ALK-NH—CO—X wherein Het is a nitrogen-containing heterocyclic moiety; ALK is a branched or unbranched alkylene group with 1-4 C atoms; X is a polyester group.

20. The method of claim 19, wherein Het is pyridine, imidazole, or piperidine.

21. A pigment dispersing agent comprising an amide-modified resin or amide-modified hydrocarbyl moiety, the amide-modified resin or amide-modified hydrocarbyl moiety obtained by modifying a resin or hydrocarbyl moiety by reaction with one or more compounds of the formula: R-Het-ALK-$NH_2$ wherein Met is a nitrogen-containing heterocyclic moiety, R represents at least one of H, C1-4 alkyl, or C1-4 alkoxy; and ALK is a branched or unbranched C1-6 alkylene group.

wherein the resin or hydrocarbyl moiety comprises a carboxylate group or a functional derivative thereof, and wherein the resin is polyurethane, polyether, polyamide, polyester, terpene, or alkyd, and wherein the hydrocarbyl moiety is branched or unbranched C1-25 carboxyalkynylene.

22. The pigment dispersing agent of claim 21 comprising at least one amide-modified polyester resin.

23. A flushing agent comprising: an amide-modified resin or amide-modified hydrocarbyl moiety, the snide-modified resin or amide-modified hydrocarbyl moiety obtained by modifying a resin or hydrocarbyl moiety by reaction with one or more compounds of the formula: R-Het-ALK-$NH_2$ wherein Het is a nitrogen-containing heterocyclic moiety; R represents at least one of H, C1-4 alkyl, or C1-4 alkoxy; and ALK is a branched or unbranched C1-6 alkylene group; and an ink solvent, wherein the resin or hydrocarbyl moiety comprises a carboxylate group or a functional derivative thereof thereof, and wherein the resin is polyurethane, polyether, polyamide, polyester, terpene, or alkyd, and wherein the hydrocarbyl moiety is branched or unbranched C1-25 carboxyalkynylene.

24. The flushing agent of claim 23 comprising at least one amide-modified polyester resin and an ink solvent.

* * * * *